Figure 1:
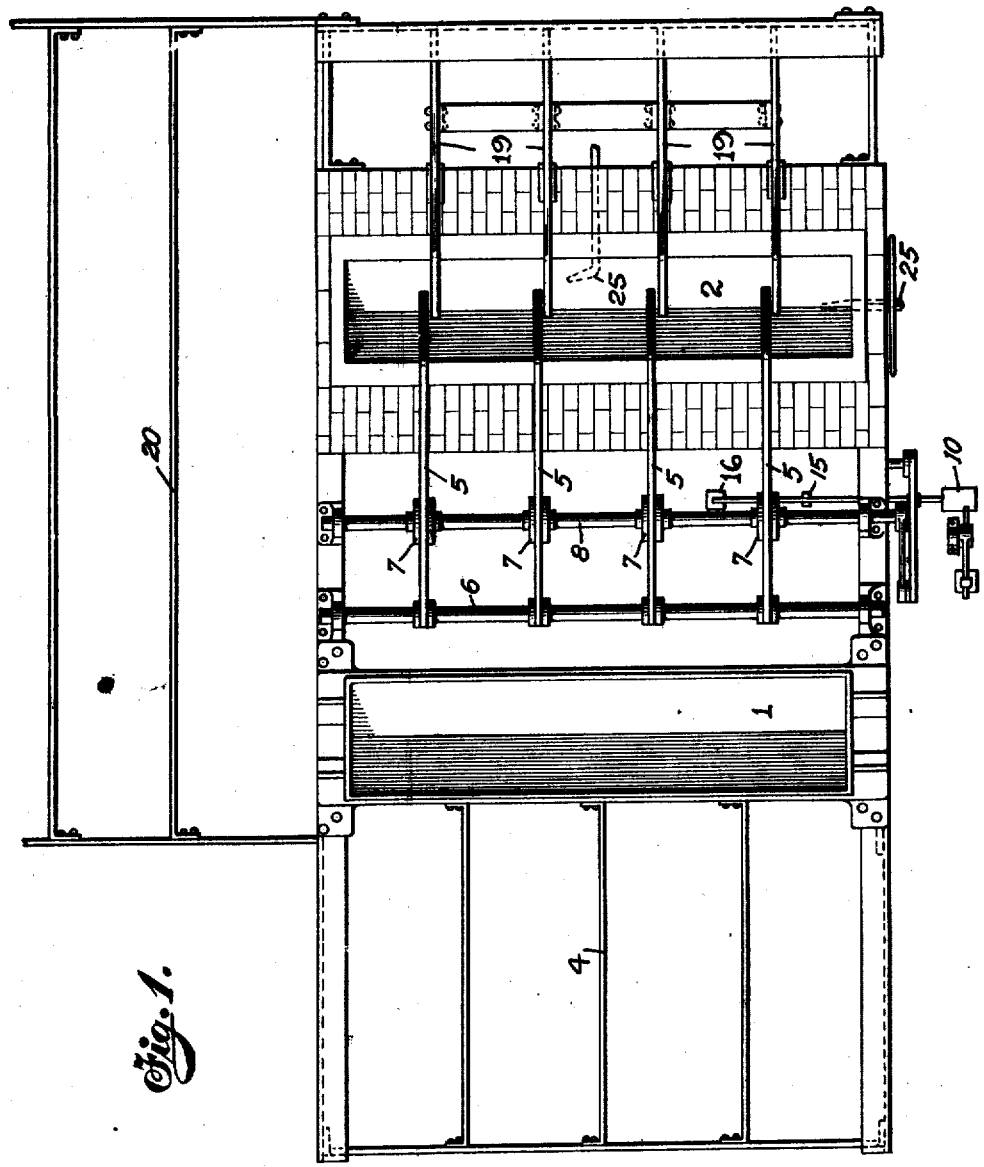

Jan. 8, 1924.  1,479,783

F. F. BENTLEY

SOLDERING APPARATUS

Filed Dec. 3, 1921  2 Sheets-Sheet 1

INVENTOR
Frank F. Bentley
BY
Emery James Blair & Hyatt
ATTORNEYS

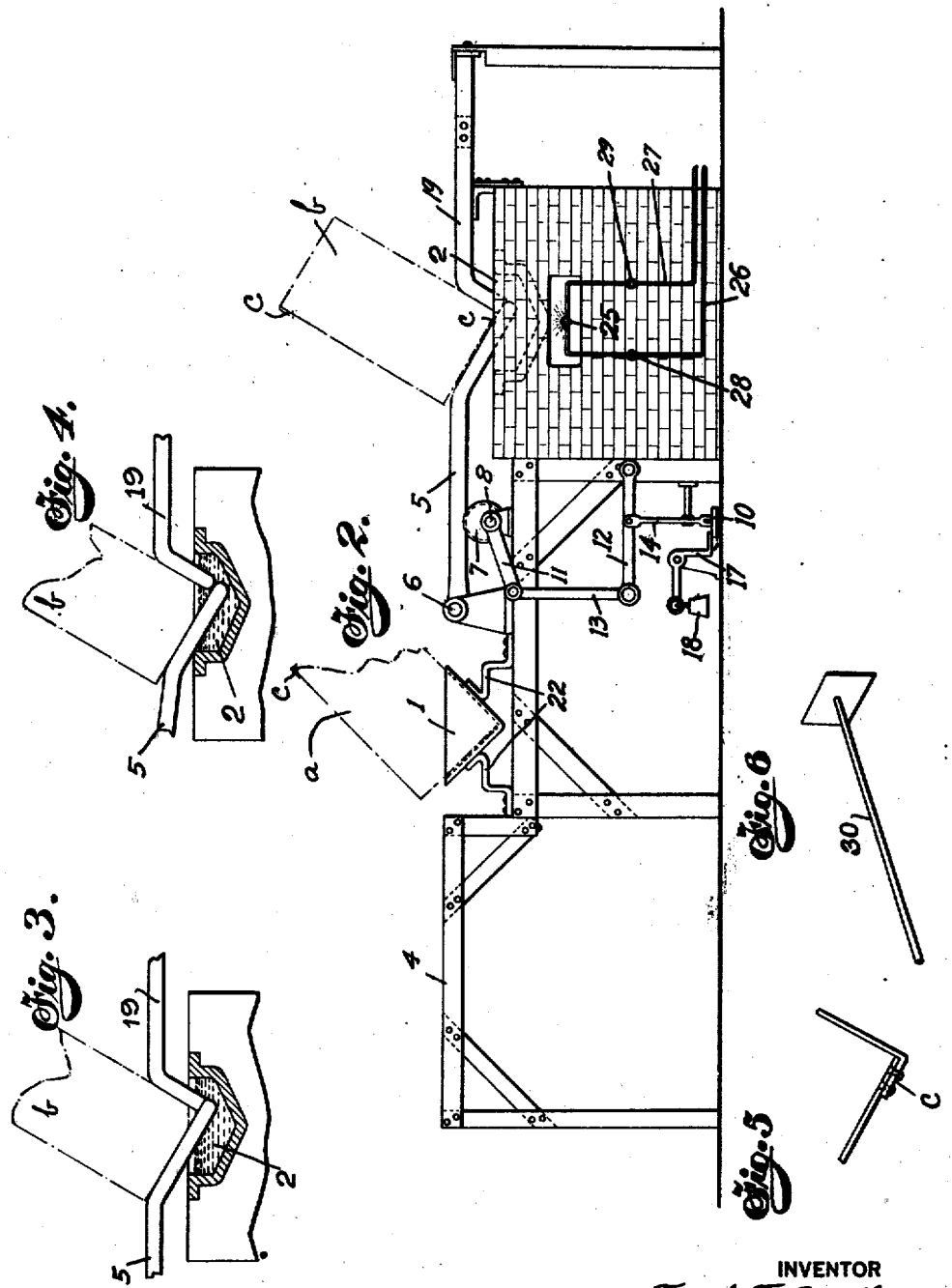

Patented Jan. 8, 1924.

1,479,783

UNITED STATES PATENT OFFICE.

FRANK F. BENTLEY, OF WARREN, OHIO.

SOLDERING APPARATUS.

Application filed December 3, 1921. Serial No. 519,571.

*To all whom it may concern:*

Be it known that I, FRANK F. BENTLEY, a citizen of the United States, and a resident of the city of Warren, in the county of Trumbull and State of Ohio, have invented an Improvement in Soldering Apparatus, of which the following is a specification.

The present invention relates generally to the manufacture of sheet metal articles and more particularly to improved apparatus for effecting a fluid-tight closure of the seams or joints of a sheet metal container as by soldering or a like method.

This invention has been developed with particular reference to the manufacture of freezing-cans for use in ice-making and will be illustrated and described in that connection.

Freezing-cans for use in the manufacture of ice are commonly made of sheet metal formed to the desired shape and riveted at the seams, solder being applied to make joints fluid-tight. The can hereinafter described is made with an overlapping seam extending from top to bottom along the side of the can and adjacent one corner. When it is borne in mind that freezing-cans are generally so shaped that the length is often several times greater than the greatest cross-sectional dimension, it will be appreciated that the proper soldering of the side seams involves considerable difficulty.

The present invention has been developed to provide a simple, effective and economical method of soldering these side seams and efficient and easily workable apparatus for use in connection therewith.

The invention will be described by reference to a preferred embodiment thereof which is shown in the accompanying drawings, wherein, Figure 1 is a plan view of apparatus embodying the invention, particularly adapted for use in soldering the seams of rectangular cans, Fig. 2 is a view in side elevation of the same apparatus, Fig. 3 is a sectional detail view showing the position of parts when a can is supported above the solder pot before dipping, Fig. 4 is a similar view showing the can in dipped position, Fig. 5 is a sectional view showing the longitudinal seam of the can indicated in Figs. 2, 3, and 4, and, Fig. 6 is a perspective view of a scraper which may be used to remove excess solder.

In the illustrated apparatus presently to be described in detail, there is provided a solder container and means to facilitate handling of the work to apply solder to the seams by dipping the work in the solder. When the apparatus is employed in the manufacture of freezing-cans, it is convenient to apply solder to the long side seam of the cam before the can bottom is applied, i. e., while the partially formed can is open at both the top and bottom. The freezing-can illustrated as being operated upon, is of the type having a substantially rectangular bottom and four sides, but open at the top. The four sides are formed of two pieces of sheet metal lapped and riveted at diagonally opposite corners to form seams c extending from the top to the bottom of the can. The soldering of the long seams is preferably performed after the riveting thereof, but before the bottom is secured to the sides. It is the can thus partially formed that is indicated in Fig. 2, 3 and 4.

Referring more particularly to the drawings, the apparatus shown comprises a flux container or trough 1 and a solder container or pot 2, with means for maintaining the solder in heated condition, together with a table or ways 5 for supporting the work, as for example the partially formed can, as it is moved from the flux trough 1 to the solder pot 2. A work table 4 is preferably provided at the side of the flux trough to receive the work before the dipping operation. In practice, the work is dipped into the flux trough to a sufficient depth to apply flux to the overlapped parts at the seam or joint. The position of a dipped freezing-can is indicated at *a* in Fig. 2. The can is then moved to the solder pot in which it is dipped to a sufficient depth to apply the molten solder to the seam both inside and outside. As the corner of the can is lowered into the solder pot, the hot solder will flow into the seam from the outside and usually through to the inside of the can, but if the seam is too tight to permit the solder to flow through, it will flow in at the open ends and along the seam.

In the apparatus shown, provision is made for facilitating the dipping of the work into the solder by providing a mechanical device under the control of the operator by means of which it is slowly lowered into the solder. It is desirable that the operator shall have accurate control of the lowering of the work for the reason that the work is usually still wet with flux and the contact of the hot solder with the flux causes a sputtering and small explosions which tend to spatter the solder.

As shown, the supporting ways 5' and the dipping means are combined in one structure. The structure consists of a plurality of parallel supporting bars 5 pivoted on a shaft 6 adjacent the flux trough and extending over the solder pot, the ends being bent downwardly, for example, at an angle of 30°. These bars are controlled by a series of cams 7, 7, which engage the under edges thereof, the cams being mounted rigidly upon a rock shaft 8, which is controlled by a foot lever 10 connected thereto by any suitable means. As shown, an arm 11 on the rock shaft 8 is connected to a lever 12 by a link 13 and this lever is connected to the foot lever 10 by a link 14. The lever 10 is pivoted to the frame at 15 and carries a weight 16 at its inner end, which tends to move the lever to so actuate the cam as to lower the table 3. A detent 17 actuated by a weight 18 normally holds the foot lever down. To lower the table, the operator pushes the detent 17 laterally with his foot and lets the lever 10 rise under control of his foot. In the structure shown, the downturned ends of the bars 5 are not shaped to alone support the can in the position indicated at $b$ in Fig. 2, but instead the can is further guided by guide bars 19, which extend downwardly into the solder pot adjacent the ends of the movable supporting bars 5. As shown, these guide bars are formed as part of a table onto which the cans may be moved after the soldering process. This table consists of a series of parallel bars, the ends of which are bent downwardly over the solder pot at an angle of, for example, 60°; that is to say, so as to lie at an angle of 90° to the direction of the ends of the movable supporting bars. In practice, the can is moved to the position shown in dotted lines at $b$ and the foot lever is operated to cause the can to be gradually lowered into the solder and held there until the solder has been effectively applied to insure a tight seam. The can is then raised out of the solder by depressing the lever 10.

The arrangement of the bent ends of the ways at 30° and 60°, as shown, is not essential but is preferred because the seam usually lies at one side of the corner, as indicated at $c$ in Fig. 2. By this arrangement, the can may be dipped to a less depth than if the angle were 45° in each case.

Cans are of different types depending to some extent upon the size of the can. In some cans there is only one vertical seam; other cans comprise two or more side pieces and a corresponding number of vertical seams. In case there are a plurality, it is necessary to repeat the soldering operation for the several seams and I prefer to provide a table or ways to facilitate the movement of the cans from the soldering pot to the flux trough for a second operation. In the structure shown, I provide supporting ways 20 at the back of the apparatus on which the cans may be placed after the soldering operation. In due course, the operations of applying the flux and the solder may be repeated for such other corners as require soldering.

I prefer to so arrange the flux trough 1 that it may be removed from the apparatus, and for this reason I have shown a support 22 in which the flux trough is removably mounted. The trough shown is V-shaped in cross-section, the two sides forming substantially a right angle, for the reason that the cans with which the apparatus illustrated is particularly designed to be used, are of rectangular cross section. The apparatus is more convenient if, as shown, the top of the trough is substantially on the level of the tables.

As a suitable means for heating the solder pot, I have shown a pair of oil burners 25, 25, one extending in from the front under the solder pot, and one extending under the solder pot from one side at or near the center thereof. Oil is supplied through one pipe 26, and air through another pipe, 27, suitable valves 28, 29, being provided to control the flow of both. Both oil and air may be supplied under pressure.

It will be noted that the frame work of the machine, including the tables or supporting ways, is constructed of bars, angle irons, and the like, and is of substantially open construction, it being unnecessary for the particular type of cans with which the illustrated apparatus is intended to be used to have continuous tables. Furthermore, it is easier to slide the cans on ways of the type shown.

In order that the manner of use of the apparatus illustrated may be better understood, I will describe one method of employing the same in the soldering of the side seams of freezing-cans. Partially formed cans, as above described without bottoms, are deposited on the table 4 by an operator or a mechanical conveyor. Two operators, one at the front and one at the back of the apparatus, lift the can at its opposite ends and dip one corner into the flux to a suitable depth to apply flux over the seam. They then lift the can, tilt it to drain out the flux from the inside and deposit the can on the table 5, pushing it forward to the position indicated at b, Fig. 2. Another operator in front of the apparatus then dips the can into the solder. To do this, he steadies the can with one hand and operates the food lever 10, leaving the can in the solder such length of time as experience and judgment may dictate. He then lifts the table 5 to lift the can free from the solder, tilts the can toward him and scrapes the surplus solder from the inside of the can, using a scraper such for example as shown at 30 in Fig. 6. The can is then placed on the table 19 to be removed by another operator, who, previous to removing the can, wipes the outside of the joint with waste or other suitable material to remove any surplus solder from the outside. If another corner of the can is yet to be soldered, the can is placed on the ways or table 20 and returned to the opposite end of the apparatus for repetition of the fluxing and soldering operations.

Obviously, various changes may be made in the apparatus without departing from the spirit of the invention and modifications may be made to adapt the apparatus for handling cans of other shapes than that illustrated, as, for example, for round cans and the like.

I claim:

1. In apparatus of the character described in combination, a flux trough, a solder pot and means for heating the same, parallel ways extending between the flux trough and solder pot to support a can while it is slid from the trough to the pot arranged to guide the can to soldering position over the soldering pot with a joint down, and means under control of the operator for causing a relative movement between the ways and solder pot to bring the same together to dip the can joint into the solder.

2. In an apparatus of the character described, in combination, a flux trough, a solder pot, ways extending from adjacent the flux trough to adjacent the solder pot and arranged to support a can as it is moved from the flux trough to the solder pot, the ends of said ways being bent down over said solder pot to support a part of the can in an angular position, and means for lowering said ways to cause a corner of the can to dip into the solder pot.

3. In an apparatus of the character described, in combination, a flux trough, a solder pot, ways extending from adjacent the flux trough to adjacent the solder pot and arranged to support a can as it is moved from the flux trough to the solder pot, the ends of said ways being bent down over said solder pot to support a part of the can in an angular position, means for lowering said ways to cause a corner of the can to dip into the solder pot, and other ways along which a can can be moved from the solder pot to the flux trough, substantially as and for the purpose described.

4. In apparatus of the character described, in combination, a flux trough, a solder pot, ways extending from adjacent the flux trough to adjacent the solder pot and arranged to support a can as it is moved from the flux trough to the solder pot, the ends of said ways being bent down over said solder pot to support a part of the can in an angular position, and means under the control of the operator for lowering said ways to dip a corner of the can into the solder pot.

5. In apparatus of the character described, in combination, a solder pot, means for heating the same, and work tables on opposite sides of the solder pot adapted to support the work adjacent the solder pot, one of said tables having a portion extending over and downward into the solder pot to afford a support to facilitate lowering the work toward the solder.

6. In apparatus of the character described, in combination, spaced work tables and a solder pot with means for heating the same therebetween, said work tables each comprising a plurality of parallel bars, the ends of which extend over the solder pot and are bent down to meet at substantially a right angle, and means for lowering one set of bars to dip a can into the solder, substantially as described.

7. In apparatus for soldering joints in the corners of partially formed cans, in combination, a flux trough, a solder pot, parallel supporting ways extending from the flux trough to the solder pot and having the ends bent downward over the solder pot, and means for moving said ends downwardly to lower a corner of a partially formed can into the solder pot.

8. In apparatus of the character described, in combination, a work table, a second work table laterally spaced therefrom, a trough support between said tables positioned below the level thereof, a removable flux trough mounted in said support and so positioned that its top is on substantially the level of the work table, a third work table, a solder pot with means for heating the same positioned between the second and third work tables, a can support over said solder pot arranged to support a can with one corner down, and means under control of the operator for actuating said can support to dip the corner of the can into the solder pot and to lift it therefrom, substantially as and for the purpose described.

9. In apparatus of the character described in combination, a flux trough, a solder pot, ways extending from adjacent the flux trough to the solder pot and downwardly at an angle into said solder pot, means cooperating with said ways to hold a can in soldering position in the solder pot with a joint down, and means under control of the operator for causing a relative movement between the can and the solder pot to dip the can joint into the solder.

In testimony whereof, I have signed my name to this specification this 1st day of December, 1921.

FRANK F. BENTLEY.